United States Patent [19]
Flisak

[11] Patent Number: 5,524,376
[45] Date of Patent: Jun. 11, 1996

[54] FISHING ROD HOLDER AND HOOK-SETTER

[76] Inventor: Ronald G. J. Flisak, 71 Sheridan Street, Guelph, Ontario, Canada, N1E 3T9

[21] Appl. No.: 208,715

[22] Filed: Mar. 11, 1994

[30] Foreign Application Priority Data

Mar. 13, 1993 [GB] United Kingdom ............... 9305202

[51] Int. Cl.⁶ .................................................. A01K 97/12
[52] U.S. Cl. .................................................. 43/15; 43/21.2
[58] Field of Search ................................. 43/15, 16, 17, 43/21.2

[56] References Cited

U.S. PATENT DOCUMENTS

| | | | |
|---|---|---|---|
| 2,784,517 | 3/1957 | Mooney | 43/16 |
| 2,811,801 | 11/1957 | Daniel | 43/15 |
| 2,917,858 | 12/1959 | Ikeuchi | 43/17 |
| 2,996,824 | 8/1961 | Faycosh | 43/16 |
| 3,205,606 | 9/1965 | Banta | 43/15 |
| 3,834,055 | 9/1974 | Bianco | 43/15 |
| 4,231,178 | 11/1980 | Black | 43/16 |
| 5,050,332 | 9/1991 | Cross | 43/17 |

FOREIGN PATENT DOCUMENTS 2026822 2/1980 United Kingdom ............... 43/15

*Primary Examiner*—Jack W. Lavinder
*Assistant Examiner*—James Miner
*Attorney, Agent, or Firm*—Anthony Asquith & Co.

[57] ABSTRACT

The device includes a tube for holding a fishing rod, which pivots to an at-rest position under the action of a main spring. The tube is held in an at-ready position by a latch. The latch is tripped by a tug on the fishing line. A safety-catch is automatically cocked, when the fisherman sets the tube, to a position where the safety catch blocks the latch, and prevents the latch from tripping. This enables the latch to be set automatically also when the fisherman sets the tube. The safety catch is released by hand when the device has been fully prepared and adjusted.

22 Claims, 8 Drawing Sheets

FISHING ROD HOLDER AND HOOK-SETTER

This invention relates to a holder of the kind used by fishermen for the temporary storage of the fishing rod while awaiting a bite, and of the kind which, when a fish bites, provides a force or motion by means of which the fish hook may be set in the mouth of the biting fish.

BACKGROUND TO THE INVENTION

When fishing from the bank of a river, it is the common practice for the fisherman, while he is waiting for a bite, ie while not actually casting the hook, or reeling in a fish, to lay his fishing rod down on the bank.

It has been recognised that the fisherman is often reluctant to lay his (expensive) rod on the ground, and proposals have been made in the prior art to provide a support, rest, stand, or holder, for the fishing rod. The function of such a device is to serve as a receptacle to support the rod clear of the ground, thereby allowing the fisherman to relinquish the rod from his hands.

In the use of these devices, even though he has relinquished manual contact, the fisherman maintains the rod under observation, so that, when a fish bites, he may quickly take the rod out of the receptacle and into his hands. He may then try to land the fish in the usual way.

As a refinement in such simple devices, the receptacle has been made movable, and is spring-biassed to an at-rest position. A strut or latch is placed in the path of the spring-biassed receptacle, and it has been proposed to use the sudden increase in the tension in the fishing line when a fish bites to automatically trigger the release of the latch.

THE PRIOR ART

U.S. patent publication U.S. Pat. No. 4,344,248 (August 1982 BROPHY) shows an example of a device in which a latch-strut is used to snag a rod-receptacle against the action of a main spring. When the line is tugged, the latch-strut falls clear, allowing the main spring to take over the rod-receptacle, and causing the rod to pivot through a large arc, thereby setting the fish hook in the fish's mouth. Other examples of devices which operate in the same way are shown in U.S. Pat. 4,486,968 (December 1984 GOULD) and U.S. pat No. 3,724,115 (April 1973 DERIE).

In the above prior art devices, the force from the main spring must be large enough to support not only the weight of the rod, but in addition the tension in the line. To "snap" the device, the tension in the line has to increase enough to overcome this spring. The invention may be applied to this type of device.

There is another type of device that provides a means for "snapping" the fishing rod, as shown in U.S. Pat. No. 3,897,646 (August 1975 SHEETS). In this type, the fishing line is wrapped around a trigger, whereby the trigger is operated when the line is tugged; the tugging on the trigger pulls the latch away from the rod-arm, allowing the main spring to force the rod-arm upwards. This type of device is more sensitive, in that the weight of the rod is not factored into the un-latching of the trigger. Another device of this type is shown in U.S. Pat. No. 3,568,352 (March 1971 HILL). The invention may also be applied to this type of device.

DETAILED DESCRIPTION OF PREFERRED EMBODIMENT

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
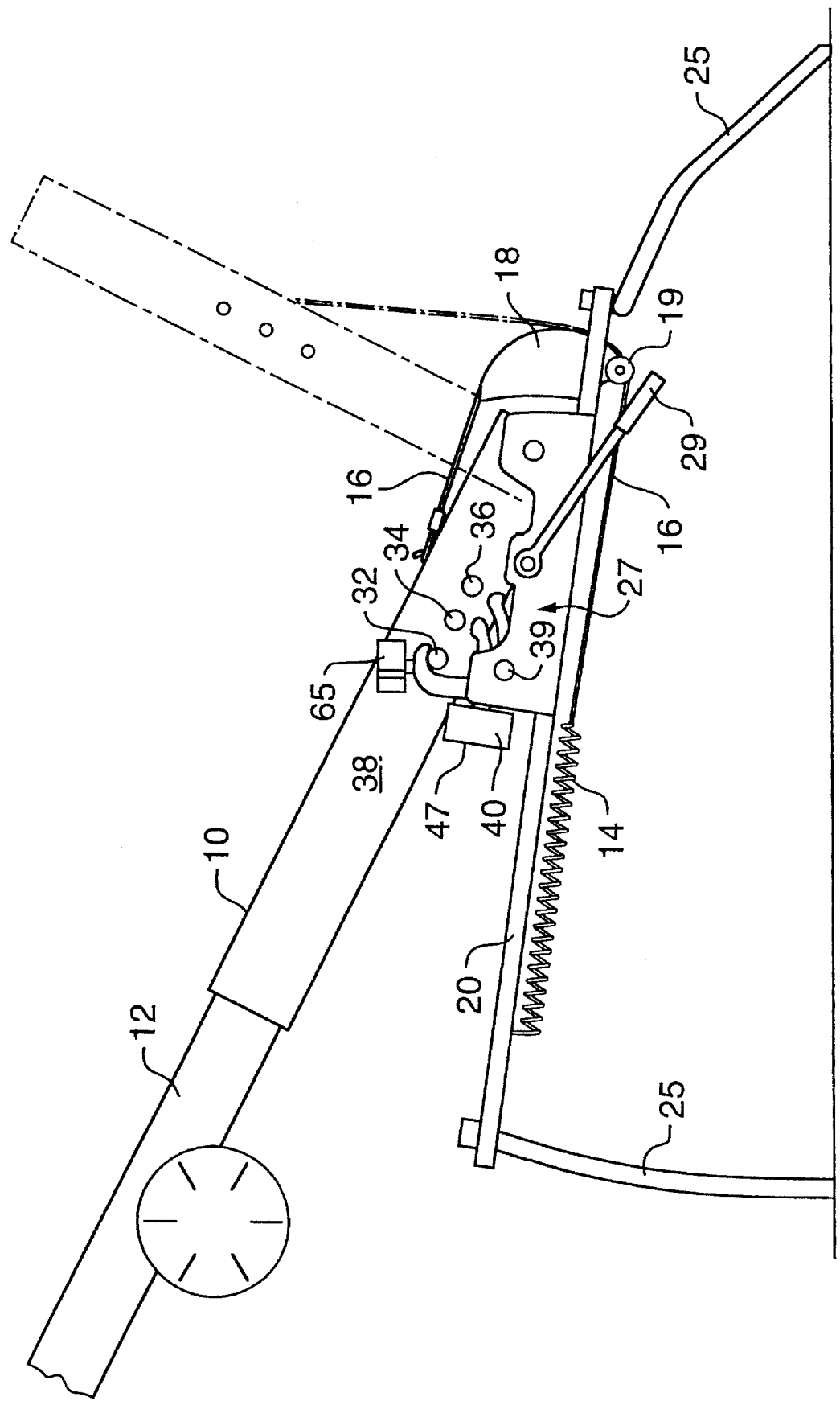
FIG. 1 is a side elevation of a fishing rod holder and hook setter apparatus which embodies the invention.

The apparatus shown in FIG. 1 includes a tube 10, which serves as a receptacle for the handle 12 of a fishing rod. The tube 10 is shown in FIG. 1 in its at-ready position, and also (by means of the dotted lines) is shown in its at-rest position.

The tube 10 is acted upon by a main spring 14, through a cable 16. The cable 16 passes from its attachment point on the tube around a guide 18, around a pulley 19, and is attached to the free end of the spring 14.

The spring 14 is mounted underneath a frame or base 20. The tube 10 is mounted for pivoting movement relative to the base 20, at a pivot 23. The force of the main spring 14 provides bias, which acts to urge the tube 10 towards its at-rest position.

The guide 18 is so shaped that when the tube 10 is in its at-ready position, the line of action of the cable 16 makes only a small radius about the pivot axis 23; when the tube 10 is in its at-rest position, on the other hand, the radius of the line of action of the cable is greater. Therefore, although the spring is less extended, and therefore exerts less force, when the tube is in its at-rest position, because the radius is greater, the turning moment acting on the tube is not much decreased. Thus, the moment on the tube remains more or less constant as the tube moves between its at-rest and at-ready positions. This is useful is maintaining a good hook-setting tension in the line as the fisherman is preparing to take the rod in his hands. It should be noted also that as receptacle swings back, the rod becomes more nearly vertical, and as a result, as the rod swings up, the rod starts to exert a smaller moment on the receptacle, a factor which again serves to keep the moment on the tube more nearly constant.

The base 20 is fitted with legs 25 front and rear. The legs may be arranged to fold for storage purposes.

In order to prepare the apparatus for operative use, the fisherman unfolds the legs 25, and places the apparatus on the dock or bank, at the water's edge. Having checked that the apparatus is seated firmly on the ground, the fisherman grasps the tube 10 in his hand (assuming the tube starts off in its at-rest position) and pivots the tube, by hand, towards its at-ready position, against the biassing force of the main spring 14.

As the tube 10 approaches its at-ready position, pins on the tube come into engagement with a latch mechanism 27, and interact therewith. The latch mechanism 27, which will be described in detail presently, receives the tube 10, and automatically snags the tube, with the result that the fisherman may now take his hands away from the tube, and the tube will stay in its at-ready position. A safety-catch in the mechanism is automatically cocked, and safeguards the tube 10 against being inadvertently released from the latch.

Next, the fisherman, having made his cast, enters the fishing rod handle 12 into the tube 10. The fisherman can at this point adjust the tension in the main spring 14 (if adjustment means were provided for that purpose), to cater for different weights of fishing rod. In determining the weight of the fishing rod, the weight of the fishing line, and the tension therein, will affect the weight.

The apparatus as shown provides an automatic fish-hook setting facility. That is to say, when a fish bites, the mechanism 27 senses that this has happened, and automatically un-snags, ie un-latches, the tube from the latch. The spring 14 then takes over the tube, and biasses the tube towards its at-rest position. The resulting steady tension applied to the line is very effective to ensure that the hook becomes properly set in the mouth of the fish.

Even if the fisherman is not paying attention to the rod, the moment the tube is unlatched, and swings back, of course the fisherman is immediately and clearly alerted by the movement, and can take the rod in hand, removing it from the tube. It may be noted that the period just as the fish starts to take the bait is critical; many fish have previously been lost because the fisherman was not quick enough to get his hands to the rod. With the apparatus as described, the apparatus maintains a steady, strong, tension in the line right at the critical period.

A pedal 29 is provided in the mechanism 27. If the fisherman feels he has got a bite, but the fish is hardly jerking the line at all, the fisherman can actuate the foot pedal; again, this action un-latches the tube.

In the apparatus as described, the sensitivity of the setting at which un-latching/un-snagging of the latch occurs may be adjusted. Some fisherman prefer to have the latch set very sensitivity, so that the latch will trigger itself upon just the slightest of tugs on the line. Other fisherman set the mechanism so that quite a strong pull on the line is required to trip the latch, on the theory that the stronger the tug, the heavier the fish.

The fisherman, having determined the sensitivity with which the latch mechanism will "snap", and having made the appropriate adjustments, turns the safety-catch, manually, to the safety-off position. Now, when the mechanism snaps, the tube is free to swing about the pivot 23.

Figure 2:
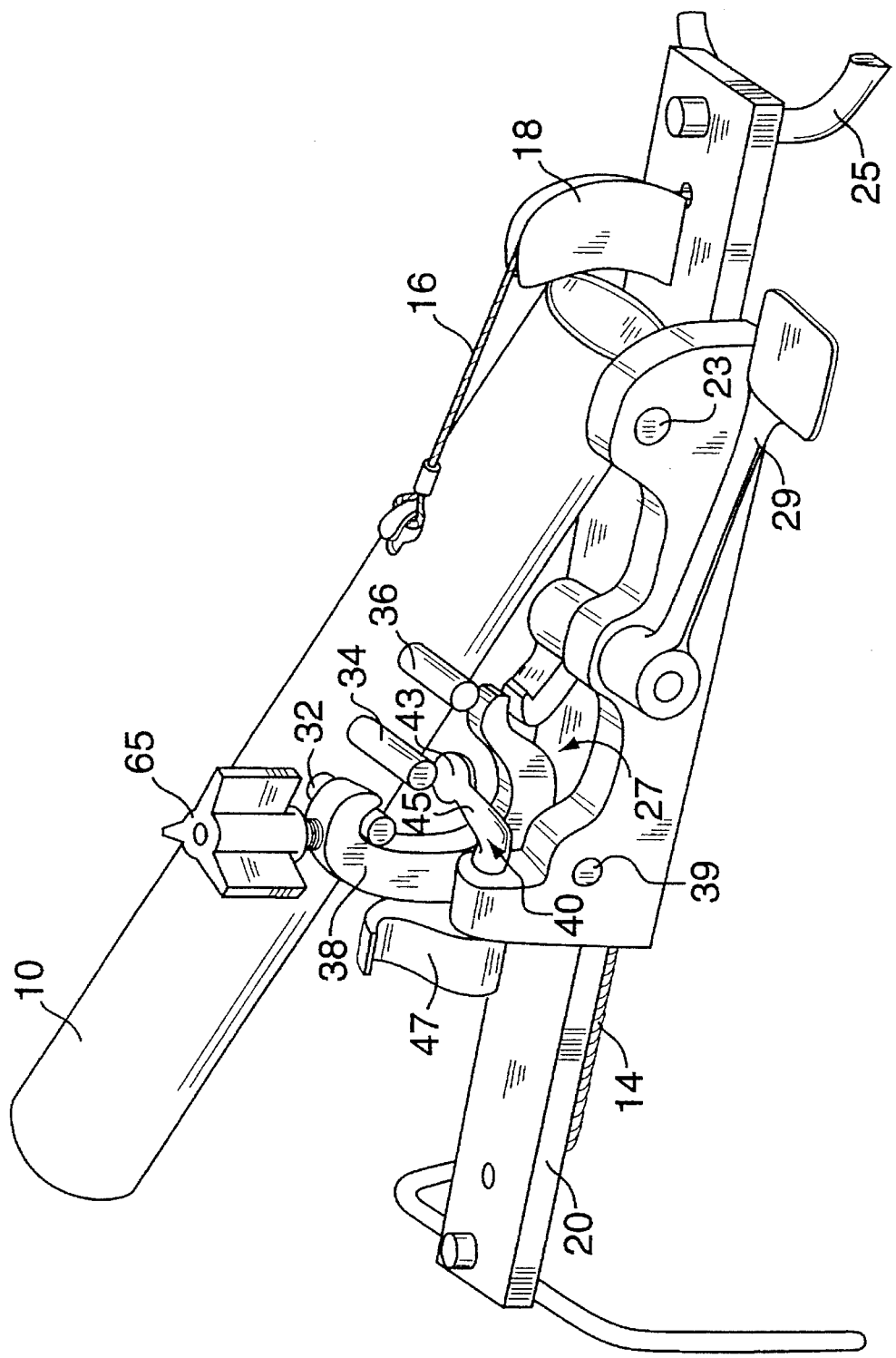
FIG. 2 is a pictorial close-up of a portion of the apparatus of FIG. 1.

The construction and operation of the latch mechanism 27 will now be described. As shown in FIG. 2, the tube 10 is fitted with a number of pins or pegs: the latch-pin 32, a safety-catch-cocking-peg 34, and a latch-cocking-peg 36. The latch-pin 32 and the latch-cocking-peg 36 interact with the latch 38. The safety-catch-cocking-peg 34 interacts with the safety-catch 40.

The latch 38 comprises a lever, which is pivoted to the base 20 at a pivot 39. The latch 38 is biassed in the anti-clockwise sense in FIG. 2 by means of a torsion spring which is coiled around the pivot-pin of the pivot 39. This spring is hidden in FIG. 2. (A spring 52 having the same effect is shown diagrammatically in the following drawings.)

The peg 34 engages an abutment 43 on a first arm 45 of the safety-catch 40. When the tube is pressed downwards, the peg 34 presses the abutment 43 downwards. When the safety-catch 40 has been pushed by the peg 34 to its safety-on position, as is shown in FIG. 2, a second arm 47 of the safety-catch lies now tucked in behind the latch 38. The safety-catch is automatically moved to this position by the action of the peg 34 pushing the abutment 43 downwards. In its safety-on position, the arm 47 of the safety-catch blocks the latch 38, and prevents the latch from moving anti-clockwise in FIG. 2.

To move the safety catch 40 to the safety-off position, the fisherman manually turns the safety-catch, in the direction whereby the abutment 43 rises, and the arm 47 moves clear of the latch 38. The arm 47 is shaped so as to form a handle to facilitate this operation of the safety-catch. In the safety-off position of the safety-catch 40, the latch 38 is free to move in the anti-clockwise sense in FIG. 2, under the action of its biassing spring (hidden in FIG. 2).

The operation of the latch mechanism can best be understood with reference to FIGS. 3–6. In these drawings, the safety catch 40A is shown as pivoting in the same plane as the latch 38A, for ease of illustration, and consequent changes are made to the shapes of the components. It should be understood that the safety catch can indeed be arranged in a number of different ways, within the scope of the invention, although the arrangement of FIG. 2 is preferred for its compactness.

Figure 3:
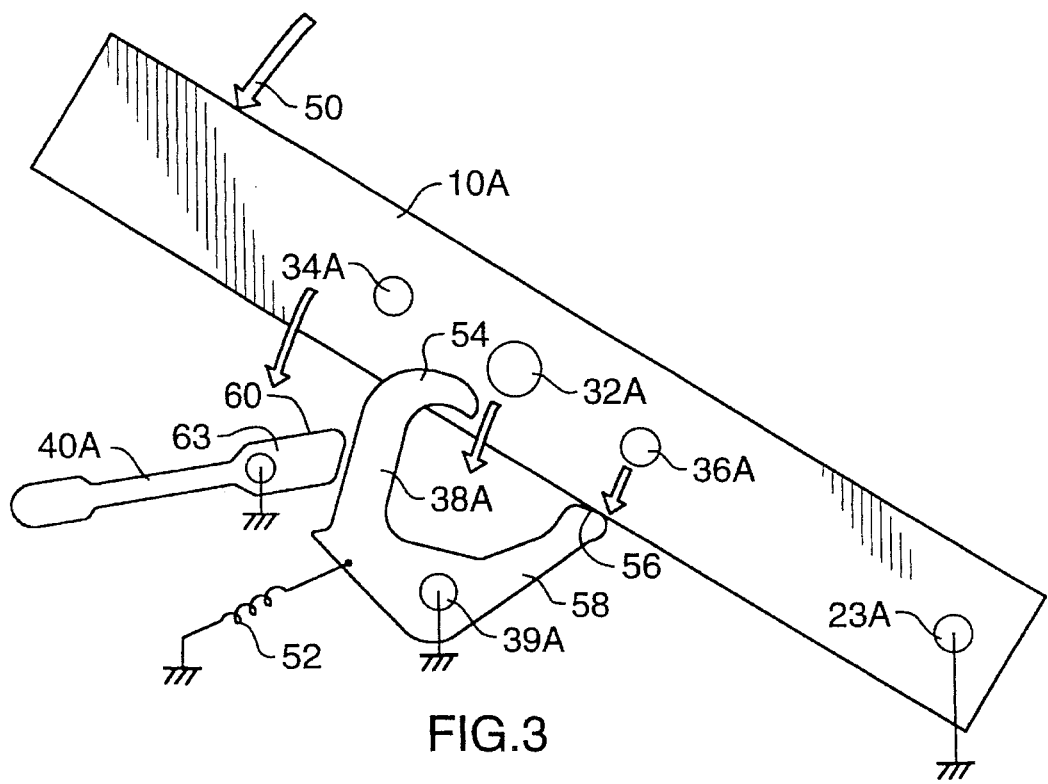
FIGS. 3 to 6 are diagrams of a modified apparatus, showing various stages in the operation of the apparatus.

FIG. 3 shows the tube 10A being pushed, as indicated by the arrow 50, in the downwards direction, about the pivot 23A. In FIG. 3, the safety-catch 40A is pivoted in the anti-clockwise sense to its safety-off position, in which safety-catch does not interfere with movement of the latch 38A. The latch is under the influence of a latch-biassing-spring 52, and the latch lies in such a position that the hook 54 of the latch lies out of the path of the latch-pin 32A, as the latch-pin approaches the latch. An abutment 56 on an arm 58 of the latch 38A lies in the path of the approaching latch-cocking-peg 36A.

Figure 4:
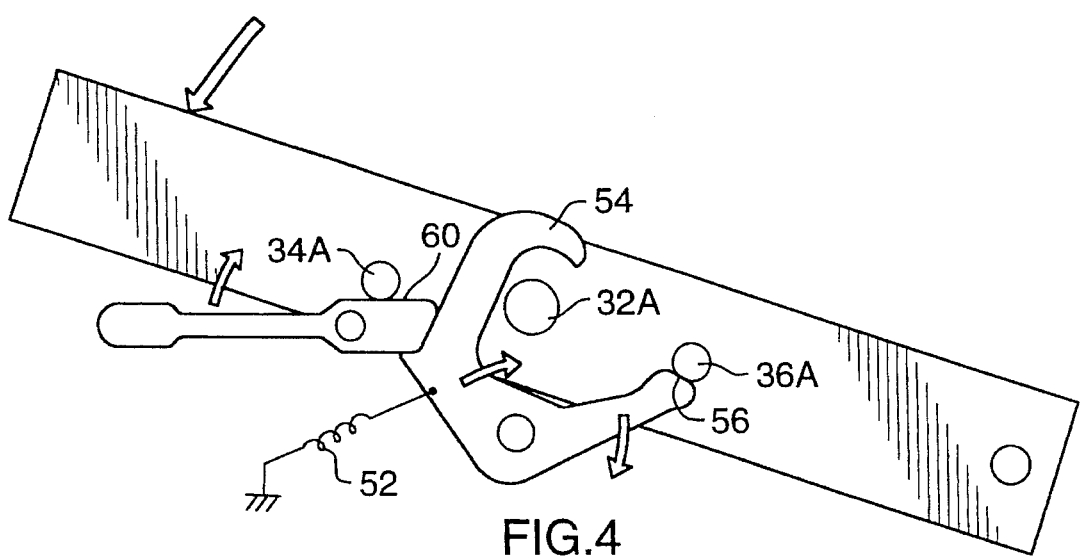

As shown in FIG. 4, the tube 10A continues downwards, and now the latch-cocking-peg 36A has started to engage the abutment 56. The engagement causes the latch 38A to rotate clockwise, against the force of the latch-biassing-spring 52.

As shown in FIG. 4, as the latch 38A rotates clockwise the latch-hook 54 moves into position behind the latch-pin 32A. In FIG. 4, in fact the tube 10A has moved past the position at which the hook 54 can engage the pin 32A. At the same time as the hook 54 is taking up its position behind the latch-pin 32A, the safety-catch-cocking-peg 34A engages the abutment 60 on the arm 63 of the safety-catch 40A, thereby moving the safety-catch 40A into the position shown in FIG. 4, in which the safety-catch prevents the latch 38A from moving back, when the tube 10A is released, to the position the latch was in when the tube was approaching (as in FIG. 3).

Having pushed the tube 10A down until the position shown in FIG. 4 is reached, the fisherman now releases the tube, whereupon the tube starts to rise, under the influence of the main spring. The latch 38A cannot rotate anticlockwise because the safety-catch 40A is now set to the safety-on position, and so what happens is that the latch-cocking-peg 36A leaves the abutment 56, and the latch-hook 54 remains in position over the latch-pin 32A.

Figure 5:
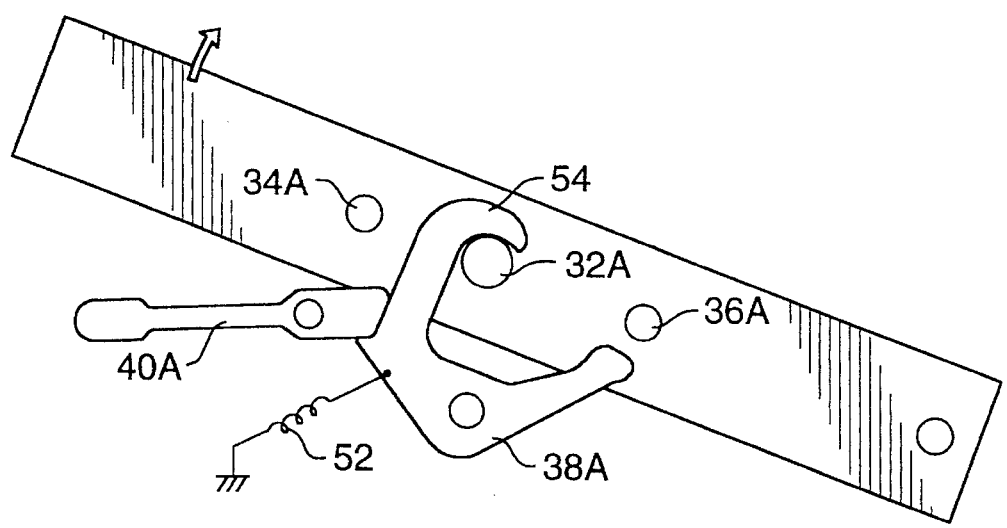

Because the hook 54 snags the latch-pin 32A, the tube 10A cannot continue to move upwards. The force of the main spring is therefore felt now by the engagement between the latch-hook 54 and the latch-pin 32A. This force, which keeps the pin and hook firmly in engagement, may be relied on to be stronger than the force on the latch 38A arising from the latch-biassing-spring 52, and therefore, once the position of FIG. 5 is reached, the safety-catch is no longer needed to keep the hook 54 of the latch in position behind the pin 32A.

Figure 6:
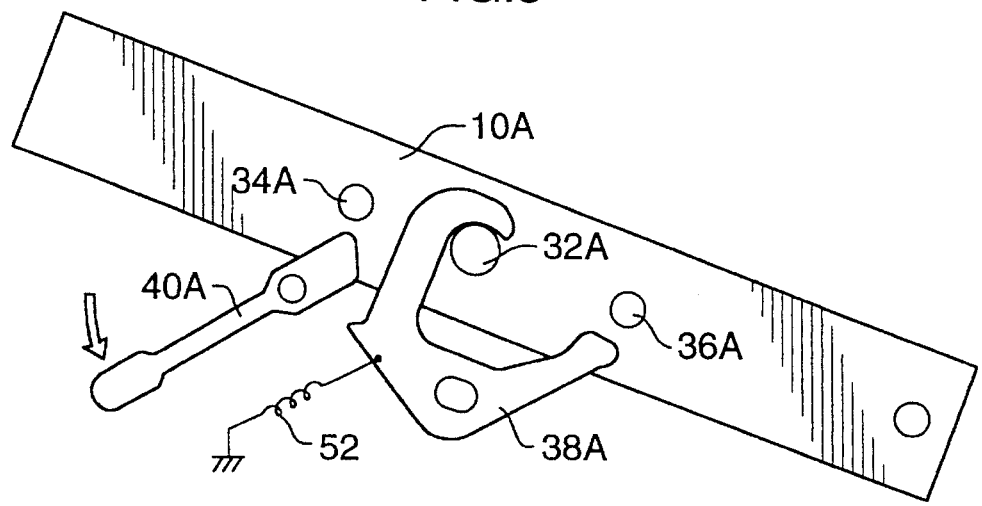

The fisherman may therefore now turn the safety-catch 40A to the safety-off position. As shown in FIG. 6, the safety-catch has indeed been moved clear of the latch 38A, and no longer blocks the movement of the latch. However, the latch does not at this point move because the pin 32A is still forcefully snagged by the latch-hook 54.

When a fish bites, it pulls the tube 10A down a slight distance, against the biassing force of the main spring. The forceful engagement of the hook 54 to the pin 32A therefore now disappears, which allows the latch-biassing-spring 52 to take over control of the latch 38A. The latch therefore moves anti-clockwise, whereby the hook 54 moves clear of the latch-pin 32A, and no longer lies in the path of the latch-pin. Once the latch-pin 32A is un-latched/un-snagged, the latch-pin is free from the hook 54, and the main spring now takes over control of the tube, and causes the tube to rotate clockwise.

Of course, when the latch-hook 54 has snagged the latch-pin 32A, the biassing force on the latch arising from the latch-biassing-spring 52 must not be large enough to pull the hook from the pin. It is only when the forceful engagement of the hook to the pin is reduced, by the fish tugging on the line, that the latch-biassing-spring can pull the latch aside.

The fisherman uses the foot pedal 29 if he wishes, for some reason, to trip the latch without waiting for the fish to trip the latch. The foot pedal 29 allows a large force to be applied to the latch 38, to pull the latch aside from the latch-pin 32. It may be regarded that operating the foot pedal dislodges the latch from the latch pin by applying a force to the latch in the same direction as the latch-biassing-spring, but of a much larger magnitude.

Figure 7:
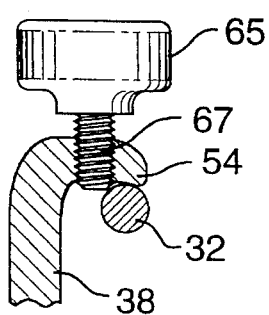
FIG. 7 is a close-up of an area of the elevation of FIG. 1.

FIG. 7 shows a detail of the engagement of the latch-hook 54 upon the latch-pin 32. With the screw knob 65 positioned so that the foot of the screw 67 does not encroach into the area underneath the hook 54, the hook extends well over the pin 32, and quite a large downwards travel of the pin is then required before the latch-biassing-spring can pull the hook clear of the pin.

On the other hand, as the screw 67 is moved into the area under the hook, the extent to which the forceful engagement must be relieved before the latch can move aside becomes much less. In the position shown in FIG. 7, the latch is set for extreme sensitivity, in that the slightest of tugs on the line now will allow the latch-biassing-spring to move the latch aside. As mentioned, not every fisherman would be interested in setting the apparatus so sensitively that it snaps when even a small fish tugs at the line. Therefore, the fisherman might wish to back off the screw 67 so that it takes a large tug to trip the latch. In fact, a scale can be marked on the knob 65 which reads off the poundage of the fish that can be expected to be caught at the various levels of latch sensitivity, though of course such a scale would be somewhat fanciful.

It should be noted that the apparatus as described can be set up for operation by the simple act of pushing the tube downwards. This action can be carried out with one hand. This is important because the fisherman needs one hand to hold the fishing rod, having just made a cast, and he only has one other hand available to cock the apparatus. Once the apparatus is cocked, which, as mentioned, involves the safety-catch being moved automatically to the safety-on position, the fisherman can place the fishing rod in the tube. He then has two hands free, whereby he can set the sensitivity of the latch, and can finally switch the safety catch to safety-off, and settle back to await a bite. In the use of the apparatus, the fisherman is not called upon to hold the fishing rod in one hand, move the tube against the main spring with the other hand, and at the same time try to set the safety-catch. The safety catch cocks itself automatically in response to the movement of the tube.

As described, the apparatus has legs 25, by means of which the apparatus may be conveniently positioned on a river bank or the like. The apparatus may also be arranged for use on a boat, either transom mounted, or deck mounted etc. When the apparatus is used for trolling, ie when the boat is moving (slowly) through the water, the setting of the latch need not be sensitive at all, since a fish biting on the moving bait and hook inevitably provides a clear, sharp tug in the line, simply from the momentum of the fish's body.

Some further features of the apparatus as shown in FIGS. 1–7 will now be described.

The device as described provides a support or holder for a fishing rod, which serves also as a fish-hook setter. As such, the apparatus includes a tube or other receptacle for receiving the fishing rod, and includes a main spring which biasses the receptacle to an at-rest position. In operation, the receptacle is held in an at-ready position by means of a latch.

Basically, the device as described differs from the previous devices of this type in that the invention provides a safety catch. By means of the safety-catch, the apparatus may be left in the set-for-operation condition, but without the danger of the apparatus being triggered accidentally. It has been known for hook setting devices to "snap" unexpectedly when a fisherman was bending over the device, whereby the fisherman sometimes suffered pinched fingers, or even a sharp blow to the face.

A benefit that arises from the provision of a safety catch is that it allows the setting or cocking of the latch of the device to be automatic. When there was no safety catch, the latch had to be cocked by hand, and the latch cocking operation was separate from the operation of readying the receptacle, ie from the operation of moving the receptacle against the main spring.

With the device as described, the safety catch acts on the latch. When set to safety-on, the safety-catch blocks movement of the latch, whereby the latch cannot move towards its latch-release position. The safety-catch permits the latch to be cocked to a latch-ready or latch-engage position, and to be held there while the receptacle is moved into position to allow the latch to snag the receptacle.

Preferably the safety-catch is cocked automatically as a consequence of the movement of the receptacle to its at-ready position. However, it is contemplated that the safety-catch could be so arranged that the fisherman cocks the safety-catch to its safety-on position, by hand, prior to his moving the receptacle towards its at-ready position. Even when the safety-catch is cocked by hand, the benefit still arises that the presence of the safety-catch allows the latch to be cocked and set automatically.

When, as is preferred, the cocking of the safety-catch to its safety-on position is done automatically, preferably it is the motion of the receptacle which is utilised, by the designer, as the source of the motion with which to effect the cocking of the safety-catch. The designer can, for instance, arrange that it is the travel of the receptacle towards its at-rest position which is utilised to cock the safety catch. Or, the designer can arrange that another place in the range of motion of the receptacle is used.

Preferably, however, in arranging for the cocking of the safety-catch, the designer arranges for the receptacle to be able to travel a little distance beyond its at-ready position, and the designer then arranges that it is this over-travel of the receptacle that is utilised to effect cocking of the safety-catch.

The benefit of using this over-travel portion of the range of movement of the receptacle is that the latch has already been placed in its latch-engage position when the receptacle passed through its at-ready position and entered the over-travel portion, and therefore the safety-catch at this time can just simply be moved into place behind the latch. Placed thus, no lost-motion allowance or resilience is required in the design of the safety-catch.

The invention may also be applied to the other type of fish-hook-setting device as mentioned, as shown in FIGS. 8–11.

In the apparatus as described with reference to FIGS. 1–7, the latch-lever is biassed by means of a latch-biassing-spring (or in some cases gravity may suffice to bias the latch-lever) in such a manner that the latch-spring acts to urge the latch-lever away from its blocking position, ie the position in which the latch-lever blocks the movement of the receptacle-arm against the influence of the main-spring. The device snaps, ie the receptacle-arm moves under the influence of the main-spring, when the contact force between the latch-lever and the receptacle-arm, and the friction associated therewith, drops to a small enough value that the force from the latch-biassing-spring is enough to move the latch-lever away.

In the other kind of fish-hook-setting apparatus, the latch-biassing-spring (or gravity) urges the latch-lever, not away from its blocking position relative to the receptacle-arm, but into its blocking position. As before, the device is triggered by extra tension in the fishing line, but now, the extra tension acts on the latch-lever to draw the latch-lever, contrary to the urging of the latch-biassing-spring, away from its blocking position. Once the latch-lever is clear of the receptacle-arm, the main-spring can take over, and the receptacle-arm snaps upwards.

Thus, in the first kind of device, the latch-spring biasses the latch-lever AWAY from the blocking position; in the second kind of device, the latch-spring biasses the latch-lever INTO the blocking position. In the first kind, the friction caused by the engagement of the latch-lever with the receptacle-arm is enough to counter the latch-biassing-spring and prevent the latch-lever moving clear, and snap occurs when the friction drops. In the second kind, the latch-biassing-spring holds the latch-lever in position to block the snap of the receptacle-arm, until the tension in the fishing line is large enough to pull the latch-lever clear, against the action of the latch-spring.

A number of other differences follow from whether the latch-lever is biassed INTO the arm-blocking-position or is biassed AWAY from the arm-blocking-position.

One of these differences is in the manner in which the latch can be cocked automatically. In FIGS. 1–7, the latch-spring biasses the latch-lever AWAY from the blocking position; here, automatic cocking of the latch upon setting the receptacle-arm is effected by providing a means (ie the safety-catch) for holding the latch-lever against the receptacle-arm until the latch is fully engaged and the friction of the engagement takes over to hold the latch-lever.

Apparatus of the kind with which the invention is concerned includes a latch which automatically sets itself to the latched position when the fisherman pushes down on the receptacle-arm. When the fisherman releases the receptacle-arm, the arm stays down, or cocked. In the kind of apparatus with which the invention is concerned, there has to be some means for triggering the snap of the receptacle arm, when the tension in the line rises due to the presence of a fish. In the prior art, it was evidently not thought possible to automate the cocking action, because the prior devices could not distinguish between downward movement of the receptacle-arm due to the fisherman's pushing the arm, when the latch was required to cock, and downward movement of the receptacle-arm due to over-tension in the fishing-line, when the latch was required to release.

When the device is of the type in which the latch-spring is biassed INTO the arm-blocking position, however, the invention still allows for automatic cocking of the latch. This aspect will be described with reference to FIGS. 8–11.

Figure 8:
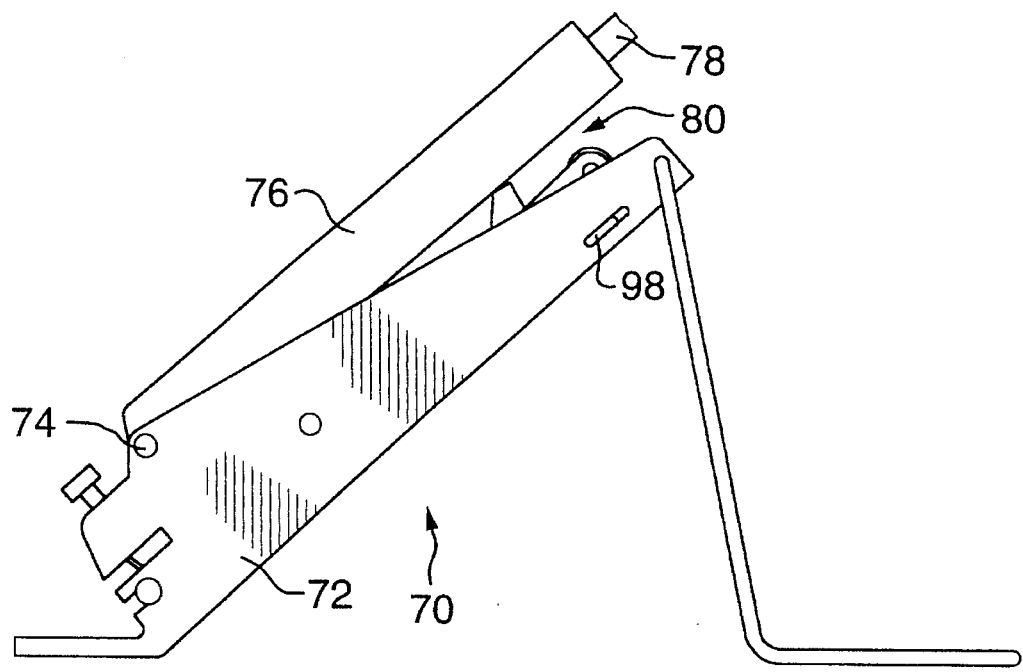
FIG. 8 is a view of a second fishing rod holder and hook setter apparatus which embodies the invention.
Figure 9:
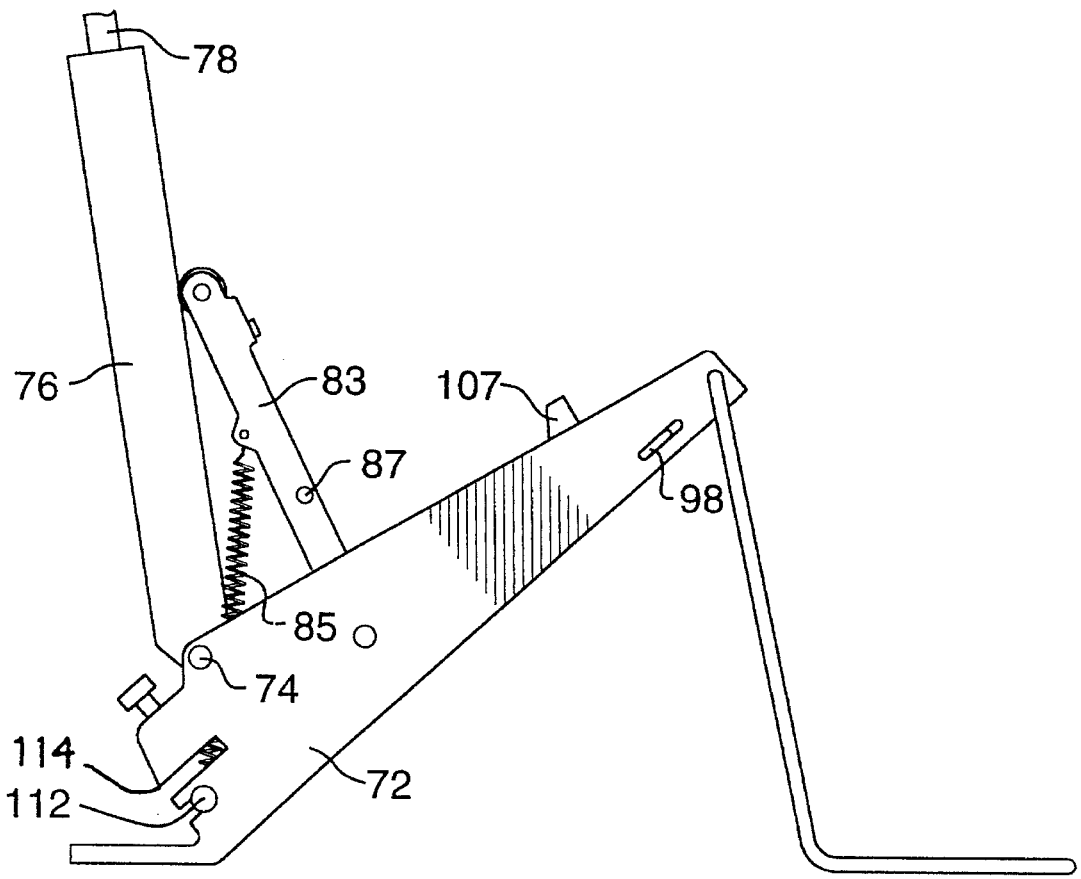
FIG. 9 shows the apparatus of FIG. 8 in a hook-setting position.

In FIG. 8 is shown a device 70 which includes a fixed frame 72, to which is pivoted, at 74, a tube 76 which is suitable for receiving a fishing rod 78. The receptacle-arm of the device 70 is composite, in that the receptacle-arm 80 includes not only the tube 76 but also a spring-arm 83. FIG. 8 shows the device 70 in the cocked position, and FIG. 9 shows the device after snap has taken place. The main-spring 85, which acts from the frame 72 to the spring-arm 83, may be seen in FIG. 9. It will be understood that the main spring 85 acts (indirectly) also on the tube 76.

Figure 10:
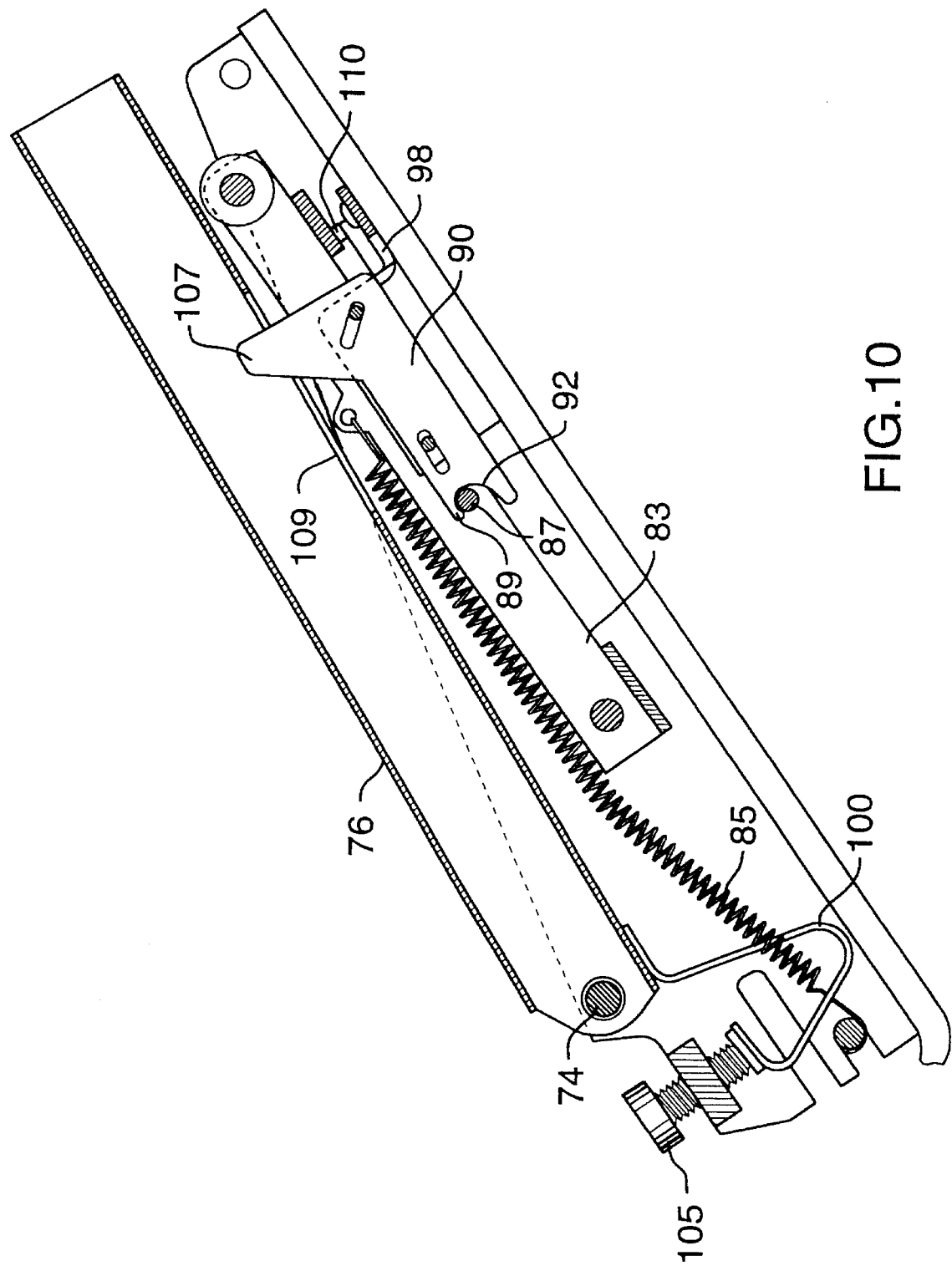
FIG. 10 is a cross-section of the apparatus of FIG. 8.

FIG. 10 illustrates a position that occurs when cocking the device. Here, a latch-pin 87 on the spring-arm 83 is held by a hook 89 on the latch-lever 90, whereby the spring-arm is held down, against the action of the main spring 85.

Figure 11:
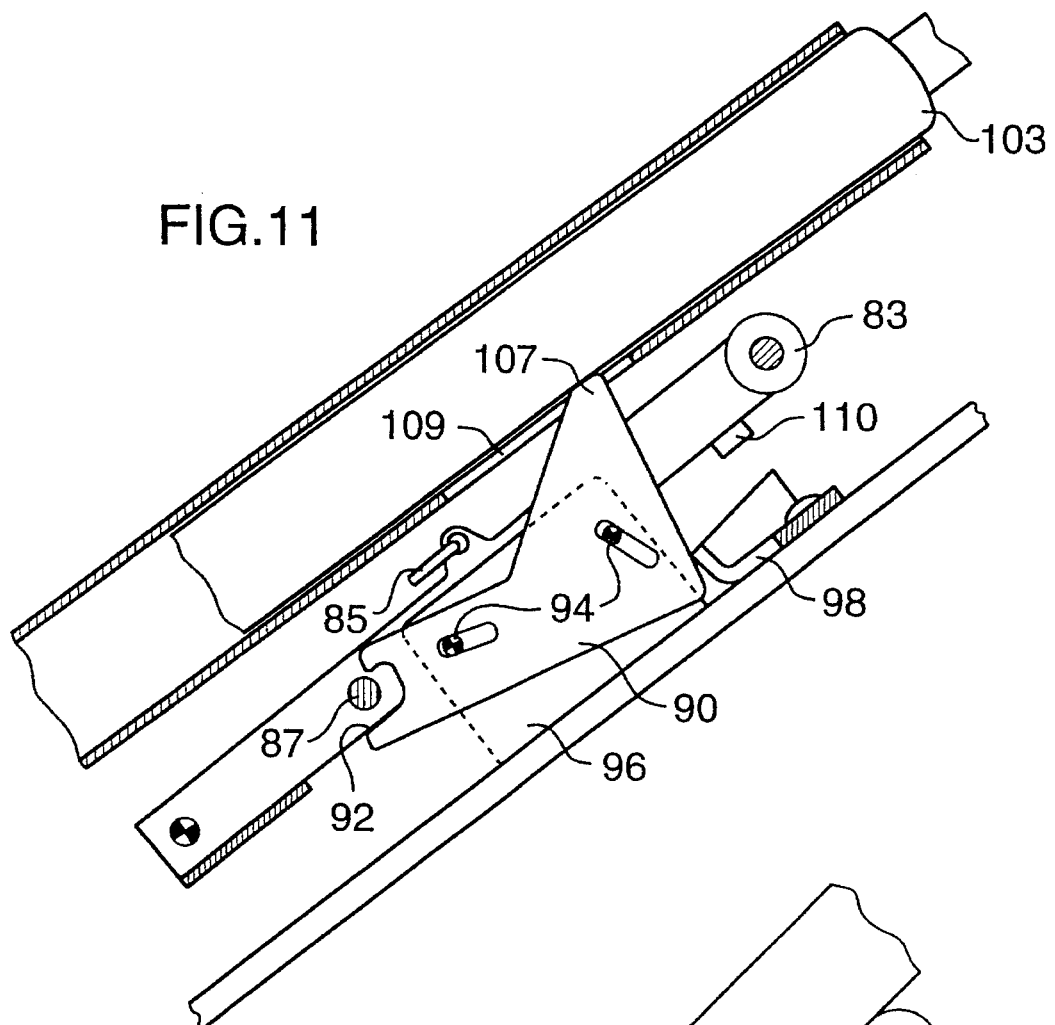
FIG. 11 is a close-up of a portion of the apparatus of FIG. 9, showing a stage in the operation of the apparatus.

FIG. 11 illustrates a position of the device 70 which occurs just at the point of snap. The operation of the device may be understood from a perusal of these drawings.

When un-cocked, the latch-lever 90 is down-at-the-right, as shown in FIG. 11. No latch-spring is shown in FIGS. 10 and 11, since gravity provides the required biassing towards the position shown in FIG. 11.

As the fisherman pushes the tube 76 downwards, and with it the arm 83, the latch-pin 87 strikes the surface 92 of the latch-lever, forcing the left-side of the latch-lever downwards, thus moving the lever toward the position shown in FIG. 10, away from the down-at-the-right position of FIG. 11. The movement of the latch-lever 90 is guided by the two pegs 94 which are secured in a block 96 which is part of the frame 72.

Once the latch-lever 90 is in the FIG. 10 position, a spring-biassed safety-catch 98 automatically slides under the right-side of the latch-lever, under the influence of a safety-catch-biassing-spring (not shown). The presence of the safety-catch underneath the lever, as shown in FIG. 10, at this time, prevents a return of the lever to the FIG. 11 position.

Now, the fisherman starts to release the downwards force on the tube 76. The tube 76 and the spring-arm 83 rise, under the influence of the main-spring 85, until the latch-pin 87 can rise no further because of the presence of the hook 89. The main-spring 85 provides a heavy force of engagement between the latch-pin 87 and the hook 89.

Once this engagement between the latch-lever and the spring-arm is in place, the safety-catch 98 can be moved aside (manually, by the fisherman), the force of the engagement providing enough force to prevent the latch-lever 83 from falling to the FIG. 11 position.

The tube 76, upon being released by the fisherman, rises clear of the spring-arm 83, under the influence of a springy strip 100.

The latch having been cocked, the fisherman places a fishing rod 103 inside the tube 76. The tube sags down a little, now that the rod is present in the tube, and the fisherman adjusts the screw 105 until the tube is poised just clear of the spring-arm 83, and just clear of the trigger-tip 107 of the latch-lever 90. The fisherman takes into account the weight of the rod and whatever residual tension there may be in the cast-out fishing-line when setting the screw 105.

When a fish bites, thus increasing the tension in the fishing-line, the tube 76 moves downwards, against the influence of the springy strip 100. The rod, residing on the inside of the tube 76, finally touches the trigger-tip 107 of the latch-lever 90.

A hole 109 in the wall of the tube 76 allows the trigger-tip 107 of the lever to engage the fishing rod 103 through the wall of the tube. It may be noted that when the rod 103 was not present inside the tube 76, the trigger-tip 107 of the lever could pass into the interior of the tube. The latch therefore is only triggered by a downward movement of the tube provided there is a fishing rod in the tube; downward movement of the tube when no fishing rod is present does not affect the latch-lever.

With the fishing-rod 103 in the tube 76, and with a fish biting, the condition of FIG. 11 is reached, where the handle of the rod has pushed the trigger-tip 107 of the latch-lever down, thereby releasing the latch-pin 87 from the hook 89, and allowing the spring-arm 83 to snap upwards. The arm 83 rises suddenly and vigorously under the influence of the main-spring 85, taking with it the tube 76 and the rod 103.

It will be recalled that the safety-catch 98 was moved aside from the blocking-position shown in FIG. 10 by manual action. The safety-catch was then hooked out of the way by snagging the catch on a complementary form 110 provided on the spring-arm 83.

As a result, when the spring-arm 83 moves upwards, the safety-catch 98 is released, and its biassing-spring starts to urge it to the position shown in FIG. 10. However, the safety-catch 98 cannot reach the position shown in FIG. 10, because the latch-lever 90 is, at this point, in the position shown in FIG. 11. The safety-catch 98 therefore remains biassed against the right side of the latch-lever until the latch-lever is once again moved to the FIG. 10 position, ie is once again re-cocked, at which time the safety-catch will once again automatically slip underneath the latch-lever.

The device shown in FIGS. 8–11 has other advantageous features. The device is collapsible for easy transport and storage. It should be noted, when considering a fisherman carrying the device, that the fisherman already has his hands full, with his basket in one hand and his fishing rod in the other. Therefore, easy foldability and stowability is important. Also, preferably the device should not be carried and stored in the cocked condition, even with the safety-catch engaged.

The frame 72 includes a means whereby the main-spring 85 may be released when the device is not in use. The frame end of the main spring engages the frame via a pin 112. When the device is in the FIG. 9 condition, the spring is slack, and the pin may then be drawn out of its slot. The pin then may be inserted into the adjacent slot 114. Slot 114 is much deeper, and in fact when the pin 112 is inserted in the slot 114, the spring goes slack and cannot be stretched. Therefore, with the pin 112 in the slot 114, the spring arm 83 and the tube 76 can lie flat, tucked neatly down inside the frame 72.

Figure 12:
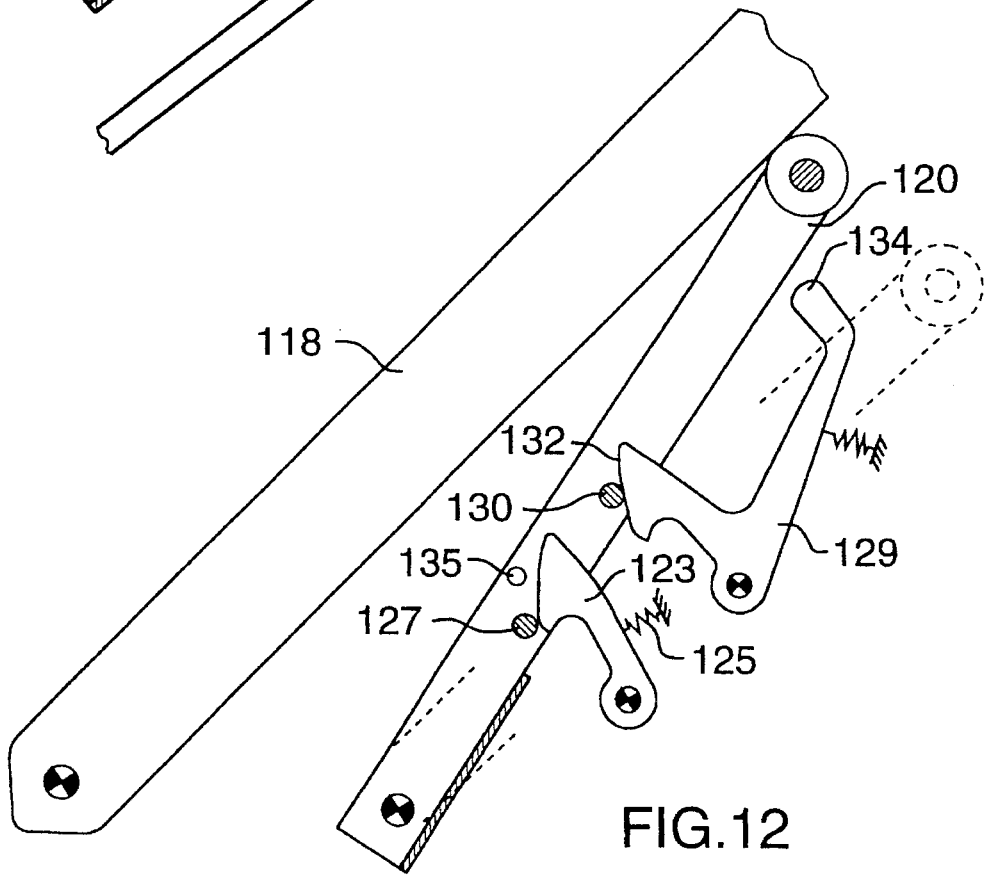
FIG. 12 is a diagrammatic view of another apparatus which embodies the invention.

FIG. 12 shows a device that operates in a similar manner to that of FIGS. 8–11. FIG. 12, however, illustrates the point that the safety catch can be arranged to operate so as to directly block movement of the spring-arm, rather than to block movement of the latch-lever.

FIG. 12 shows the device in the condition where the fisherman is pushing the tube 118 downwards to cock the device (no rod being present in the tube 118 at this time). The cocking operation has reached the stage where, as a result of the downwards movement of the spring-arm 120, the safety-catch 123 is being pushed aside to the right, against the safety-catch-spring 125, by the safety-catch-cocking-peg 127. The latch-lever 129 has not yet started to move, but, as may be seen, the latch-cocking-peg 130 is about to strike the ramp 132 of the latch-lever 129.

As downward movement of the spring arm 120 continues, the safety-catch 123 slips over the peg 127, and the latch-lever 129 similarly slips over the peg 130. To reach this position, the tube 118 had to be pushed down to the lowermost extent of its travel, at which point the trigger-tip 134 of the latch-lever 129 is penetrating through a hole (not shown) in the wall of the tube 118 and well into the interior of the tube. The trigger-tip 134 of the lever is free to do this, since there is no fishing rod present in the tube at this time.

Now, the fisherman takes his hand off the tube 118, whereby the spring-arm 120 rises under the action of the main spring (not shown) until the peg 130 and the latch-lever 129 are engaged. The designer has arranged the device such that at this point the trigger-tip 134 of the latch-lever 129 does not penetrate inside the tube 118.

Next, the fisherman inserts the fishing rod into the tube 118. Having checked that all seems in order, the fisherman now releases the safety-catch 123. He does this by moving the safety-catch aside manually. A safety-catch-retaining-peg 135 has been provided on the spring-arm 120, and the fisherman snags the safety-catch 123 onto the peg 135 to retain the catch in the held-aside position.

It is preferred that the safety-catch 123 should be held aside against an abutment which, like the peg 135, is on the spring-arm 120, and not on, for example, the fixed frame of the device. When the abutment is arranged on the spring-arm, as in FIG. 12 (and as in FIGS. 8–11) the abutment disappears when the spring-arm snaps, leaving the safety-catch ready once more to automatically hook over the cocking-peg 127, in FIG. 12, next time the device is cocked. If the safety-catch were snagged to an abutment on the fixed frame, the safety-catch would need to be manually reset before re-cocking.

As mentioned, with the fishing rod in place in the tube 118, downwards movement of the tube will cause the rod to strike the trigger-tip 134 of the latch-lever 129. This causes the latch-lever to break free from the peg 130, whereby the spring-arm 120 is free to snap upwards.

FIG. 12 is diagrammatic, and much detail is omitted to better illustrate the mechanism. The pivots shown as shaded quadrants are pivots to the fixed frame of the device. The same applies to FIGS. 13 and 14.

Figure 13:
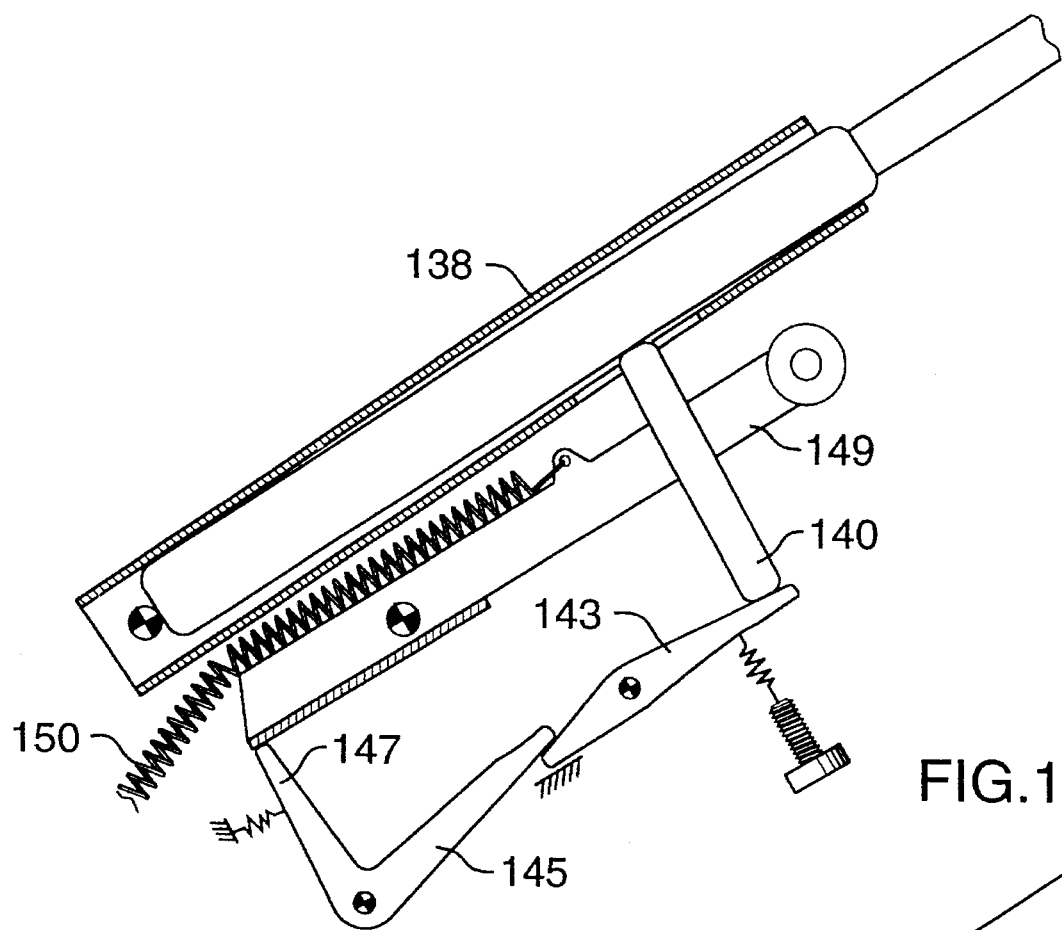
FIG. 13 is a diagrammatic view of a further apparatus which embodies the invention.

FIG. 13 shows that the latch-lever may be arranged as a strut-in-compression type of abutment, rather than strictly as a hook or catch. In FIG. 13, the device has already been cocked, and a fishing rod is in place in the tube 138. In fact, the device is just on the point of being snapped. Extra tension in the fishing line has drawn down the tube 138 until the trigger 140 presses down on the right end of a trip-lever 143; in turn, this action lifts the right arm of the latch-lever 145. Finally, the arm 147 of the latch-lever breaks free of the spring-arm 149, whereby the spring-arm snaps upwards, under the influence of the main-spring 150.

Not shown in FIG. 13 is a safety-catch, although same should be provided. The safety-catch may be arranged to operate, like that of the FIG. 8, on the latch-lever; or, like that of FIG. 12, directly on the spring-arm.

Figure 14:
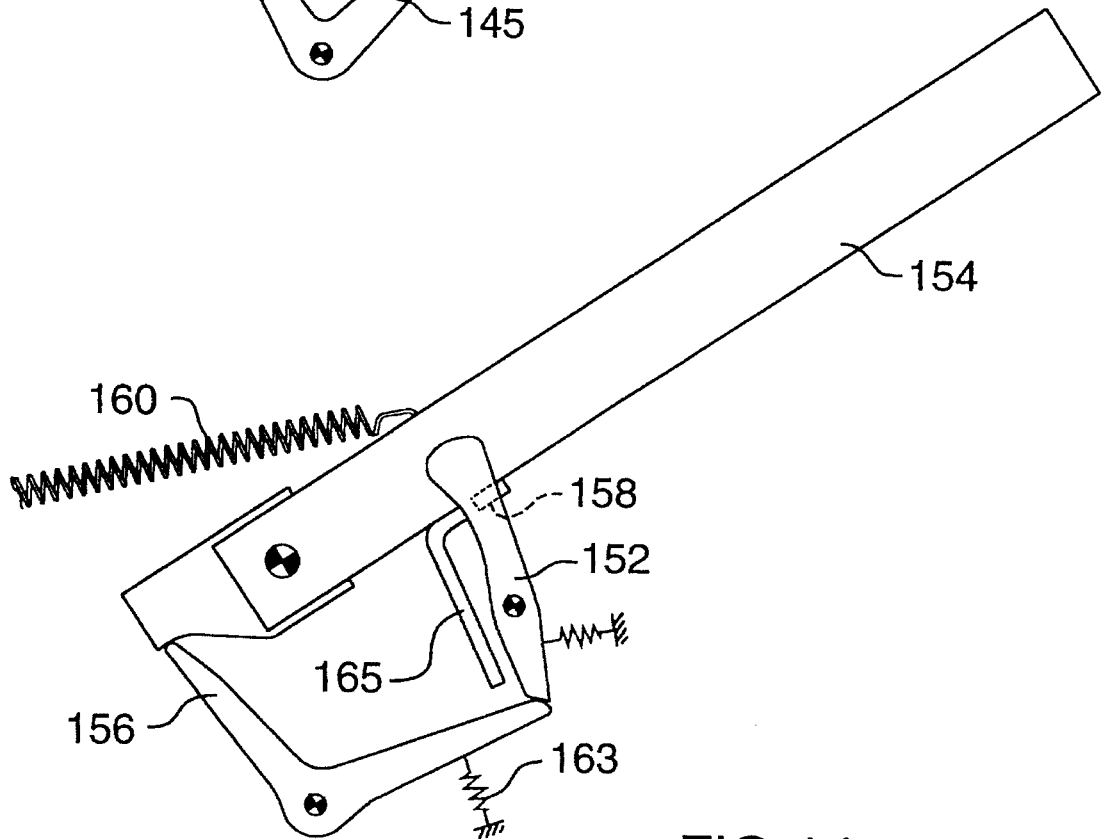
FIG. 14 is a diagrammatic view of yet another apparatus which embodies the invention.

FIG. 14 illustrates that the latch-lever may be arranged as a strut-in-compression, rather than as a hook or catch, also in the case where, as in FIG. 1, the latch-lever is spring-biassed AWAY from its cocked or blocking position. In this case, it will be recalled, the designer arranges that the latch-biassing-spring is light enough that the latch-lever remains in the blocking position so long as the receptacle-arm remains pressed tightly against the latch-lever.

In FIG. 14, the device is shown having just been cocked, but with the safety-catch 152 still in place. Once the receptacle-arm 154 is firmly settled against the latch-lever 156, the fisherman may release the safety-catch. He does this by moving the top of the safety-catch to the left until the safety-catch snags around a suitable hook 158 attached to the receptacle-arm 154. Now, the device will snap when tension in the fishing line eases the bottom end of the receptacle-arm away from the latch-lever.

To cock the device of FIG. 14, the fisherman presses the receptacle-arm 154 downwards against the influence of the main spring 160. When the arm 154 is moving downwards, the latch-lever 156 is lying clear of the bottom end of the arm 154, under the influence of the latch spring 163.

Attached to the receptacle-arm 154 is a bar 165. When the fisherman pushes the receptacle-arm downwards, the tip of this bar picks up the latch-lever 156, and rotates the latch-lever clockwise. The fisherman continues the movement of the receptacle-arm 154 until the latch-lever 156 has moved far enough until the safety-catch 152 has slipped into the blocking position. Now, the fisherman releases the receptacle arm 154, which rises. The bar 165, being withdrawn, of itself would allow the latch-lever 156 to rotate anticlockwise, under the influence of the latch-biassing-spring 163; but the latch-lever is blocked from such movement by the presence of the safety-catch 152. That is to say: the safety-catch 152 holds the latch-lever 156 in position to block the movement of the receptacle-arm 154 urged by the main-spring 160. This is the position as shown in FIG. 14. Cocking will be complete upon release of the safety-catch 152.

In all the devices as illustrated, it will be understood that the latch mechanism is set or cocked automatically by the action of the fisherman in simply pressing down the receptacle-arm. This action can be performed with one hand, which is a large advantage given that the fisherman, at the time he comes to set the device, has just made a cast and is holding the fishing rod in his other hand.

The presence of the automatically-set safety-catch is preferred, for safety reasons, since inadvertent snapping of the device could injure the hands of the fisherman, or even could cause him to be struck in the face if he happens to be leaning over the device.

As described, in the type of device where the latch-lever is biassed AWAY from its blocking position, the safety-catch can be used as the means to hold the latch-lever in its blocking position until the receptacle-arm is firmly engaged with the latch-lever.

In the other type of device, where the latch is biassed INTO the position where it will block the upwards movement of the arm, the designer must see to it that the cocking movement does not also trigger the snap, given that it is the same downwards movement of the arm that produces both the cocking action and the triggering action. As seen, the simple expedient of not having the rod present in the receptacle at the time of cocking is all that is required to ensure that the device is not triggered during cocking. If the fisherman tries to cock this type of device with the fishing rod already inserted in the tube, he will not be able to do so.

Separating the receptacle-arm into two components is useful when the device is of the type where the latch is biassed INTO the position where it will block the upwards movement of the arm. As described, the receptacle-arm includes both the tube and the spring-arm. By separating them, the arms can be given the two different springs, whereby the main-spring can be much more powerful than the light spring supporting the tube and rod. Thus, when the snap has occurred, the powerful main-springs can hurl the rod upwards and backwards with a stronger force than the tension in the line, which makes for a good hook-setting effect. In the other type of device, at the moment of snap, the tension in the line inevitably is a little greater than the spring force, and the actual movement of the rod occurs when the fish causes or allows the tension in the line to ease somewhat.

The cocking movement has been described as involving the fisherman in pushing down on the tube; in fact, if a suitable handle is provided on the spring-arm, the fisherman may apply the downward push directly to the spring-arm. When the push is applied to the tube, a means has to be provided, as described, during cocking, for preventing the downward movement of the tube from triggering the snap. When the fisherman pushes directly on the spring-arm, ie on a handle on the spring-arm, the tube need not move downwards during cocking, and the precaution against unwanted triggering would not be required.

The invention provides automatic cocking of the device in response to the simple, single movement of the arm against the action of the main-spring of the device. In applying the invention to some of the devices, when cocking the device the fisherman pushes down on the arm until he hears the safety catch click into position to block movement of the latch-lever. Then, he releases the arm, knowing that the arm will be caught by the latch. Then, he releases the safety-catch.

When applying the invention to other devices, the fisherman again pushes down on the arm, against the main spring. In these devices, downwards movement of the arm is effective to activate the trigger, ie to knock the latch aside from its blocking position. The latch-biassing-means is effective to urge the latch INTO its blocking position, from which the trigger knocks it aside to allow the arm to snap. During cocking, therefore, the trigger action must be disabled, preferably automatically; the trigger having been disabled, when the fisherman releases the arm the latch is still present in the blocking position, since nothing has knocked the latch away from its blocking position.

I claim:

1. Fishing Rod holder and fish hook setting apparatus, wherein:

the apparatus includes a receptacle which is suitable for receiving the handle of a fishing rod;

the apparatus includes a fixed frame and a pivot means, about which the receptacle is pivotable between an at-rest position and an at-ready position of the receptacle;

the apparatus includes a main spring, which is effective to provide a force biassing the receptacle towards its at-rest position;

the apparatus includes a latch, which is mounted on one of either the receptacle or the frame, and which is movable relative thereto between a latch-engage position and a latch-release position of the latch;

the arrangement of the latch is such that the latch is engageable with a latch-abutment, which is unitary with the other of either the frame or the receptacle;

the apparatus includes a latch biassing means, which is effective to bias the latch to its latch-release position;

the apparatus is so arranged that when the latch is in its latch-engage position and when the receptacle is in its at-ready position, the latch is in engagement with the latch abutment, and the biassing force of the main spring acts through the latch, and through the engagement of the latch with the latch-abutment;

the nature of the engagement of the latch with the latch-abutment is such that, when the biassing force of the main spring is acting through the latch and through the engagement of the latch with the said latch-abutment, that said engagement provides a resistive force between the latch and the latch abutment that is strong enough to prevent the latch biassing means from moving the latch towards its latch-release position;

the nature of the engagement of the latch with the latch-abutment is such that when the receptacle moves beyond its at-ready position, being movement in the direction against the biassing force of the main spring, the said resistive force provided by the engagement between the latch and the latch abutment falls to a small enough magnitude as to enable the latch biassing means to move the latch towards its latch-release position;

the apparatus includes a safety catch;

the safety catch is mounted for movement between a safety-on position and a safety-off position of the safety-catch;

in its safety-on position, the safety-catch resides in such a position with respect to the latch as to block movement of the latch from its latch-engage position towards its latch-release position;

in its safety-off position, the safety-catch resides in such a position with respect to the latch as to permit free movement of the latch between its latch-engage position and its latch-release position;

and the safety catch is movable from its safety-on position to its safety-off position by manual hand operation.

2. Apparatus of claim 1, wherein the apparatus includes automatic means for cocking the safety-catch to its safety-on position.

3. Apparatus of claim 2, wherein:

the receptacle is pivotable, against the force of the main spring, to an over-travel position, being a position of the receptacle beyond the said at-ready position;

the automatic means is effective to automatically set the safety-catch to the safety-on position in response to movement of the receptacle between the at-ready position and the over-travel position.

4. Apparatus of claim 3, wherein;

the apparatus includes a latch-cocking-tappet on the other of either the frame or the receptacle, which is engageable with a complementary cocking-abutment on the latch;

the arrangement of the latch-cocking-tappet and the cocking-abutment on the latch is such that, when the receptacle moves about its pivot in the direction against the biassing force of the main spring, and approaches its at-ready position, the latch-cocking-tappet moves into engagement with the cocking-abutment on the latch;

the engagement between the latch-cocking-tappet and the cocking-abutment on the latch is such that continued motion of the receptacle in the direction against the biassing force of the main spring is converted by the engagement into corresponding motion of the latch, being motion of the latch in the direction away from its latch-release position, against the latch-biassing means, and towards its latch-engage position;

the engagement between the latch-cocking-tappet and the cocking-abutment on the latch is such that, as the receptacle moves through its at-ready position in the direction against the biassing force of the main spring, the latch moves into its latch-engage position;

the arrangement of the latch is such that, if the receptacle were to move back through the at-ready position and if at the same time the safety catch were to reside in its safety-off position, the latch, under the action of the latch biassing means, would then revert to its latch release position and would thereby not engage the latch abutment;

the arrangement of the latch is such that, if the receptacle moves back through its at-ready position when the safety-catch is in its safety-on position, the safety catch occupies a location in the path of movement of the latch from its latch-engage position to its latch release position;

whereby, when the safety-catch is in its safety-on position, the safety-catch blocks the latch from reverting to its latch-release position, thereby enabling the latch to engage the latch abutment, and thereby snagging the receptacle in its at-ready position.

5. Apparatus of claim 4, wherein:

the apparatus includes a safety-catch-cocking-tappet on the other of either the frame or the receptacle, which is engageable with a complementary cocking-abutment on the safety-catch;

the arrangement of the safety-catch-cocking-tappet and the cocking-abutment on the safety-catch is such that, when the receptacle moves about its pivot in the direction against the biassing force of the main spring, and moves beyond its at-ready position, the safety-catch-cocking-tappet moves into operative engagement with the cocking-abutment on the safety-catch;

the operative engagement between the safety-catch-cocking-tappet and the cocking-abutment on the safety-catch is such that continued motion of the receptacle in the direction against the biassing force of the main spring is converted by the engagement into corresponding motion of the safety-catch, being motion of the safety-catch in the direction away from its safety-off position, and towards its safety-on position;

the arrangement of the safety-catch is such that, when the receptacle moves back through its at-ready position, the safety-catch remains in its safety-on position, thereby blocking movement of the latch away from the latch-engage position.

6. Fishing Rod holder and fish hook setting apparatus, wherein:

the apparatus includes a receptacle which is suitable for receiving the handle of a fishing rod;

the apparatus includes a fixed frame and a pivot means, about which the receptacle is pivotable between an at-rest position and an at-ready position of the receptacle;

the apparatus includes a main spring, which is effective to provide a force biassing the receptacle towards its at-rest position;

the apparatus includes a latch, which is pivotably mounted on the frame, and which is movable between a latch-engage position and a latch-release position;

the latch is engageable with a latch-pin mounted on the receptacle;

the apparatus includes a safety-catch, which is carried on the frame, and which is movable between a safety-on position and a safety-off position;

the apparatus includes a latch-cocking-tappet, which is unitary with the receptacle, and which engages a cocking-abutment on the latch when the receptacle moves against the biassing force of the main spring towards and through its at-ready position;

whereby, upon engagement of the latch-cocking-tappet with the cocking-abutment on the latch, and upon continued movement of the receptacle in the direction against the biassing of the main spring, the latch-cocking-tappet moves the latch from its latch-release position to its latch-engage position;

the apparatus includes a safety-catch-cocking-tappet, which is unitary with the receptacle, and which engages a cocking-abutment on the safety-catch when the receptacle moves beyond its at-ready position;

whereby upon engagement of the safety-catch-cocking-tappet with the cocking-abutment on the safety-catch, and upon continued movement of the receptacle against the biassing force of the main spring, the safety-catch-cocking-tappet moves the safety-catch from its safety-off position to its safety-on position;

whereby, when the receptacle is left to return to its at-rest position, under the biassing force of the main spring, the safety-catch, being in the safety-on position, blocks the path of the latch, and prevents return movement of the latch from its latch-engage position to its latch-release position, thereby enabling the latch to snag the latch pin, and thereby holding the receptacle in its at-ready position;

the arrangement of the safety catch is such that the safety-catch is movable, by hand manipulation, from its safety-on position to its safety-off condition;

whereby, when the safety catch is moved to the safety on position after the latch pin is snagged by the latch, the latch pin is left still snagged by the latch;

whereby a subsequent movement of the receptacle in the direction against the biassing force of the main spring is effective to un-snag the latch, allowing the latch to revert to its latch-release position, and allowing the receptacle to return to its at-rest position.

7. Apparatus of claim 6, wherein:

the latch is formed with a latch hook, and the latch hook is shaped for engagement with the latch pin on the receptacle;

the latch hook is adjustable, and the apparatus includes an operable means for adjusting the hook, which, when operated, is effective to adjust the magnitude of the subsequent movement of the receptacle against the biassing force of the main spring required to un-snag the latch.

8. Apparatus of claim 6, wherein the apparatus includes a spring guide means, which is so mounted and arranged that as the receptacle moves from the at-ready position to the at-rest position, and the force from the main spring spring decreases, the guide means increases the pivot radius about which the main spring acts on the receptacle, whereby, as the receptacle moves to its at-rest position, the product of the force on the receptacle and the pivot radius decreases less rapidly than does the spring force.

9. Apparatus of claim 8, wherein:

the apparatus includes a base, the receptacle being pivotably mounted above the base;

the main spring is disposed underneath the base, a free end of the spring being connected via a cable to the receptacle, and the cable passes over the said guide means.

10. Apparatus of claim 6, wherein:

the apparatus includes a manually-operable trigger;

the trigger includes a latch-releasing-tappet, which is engageable, upon operation of the trigger, with the latch when the latch is in its latch-engage position and the receptacle is in its at-ready position;

the arrangement of the trigger is such that forceful operation of the trigger, with the safety-catch in its safety-off position, is effective to move the latch from its latch-engage position to its latch-release position, whereby the latch becomes un-snagged from the latch pin, allowing the receptacle to return to its at-rest position.

11. Fishing rod holder and hook setting apparatus, wherein:

the apparatus includes a receptacle for receiving a fishing rod, and includes an arm and a main spring which are effective to urge the fishing rod upwards in a hook-setting manner, towards an up position, in response to the detection of a bite;

the apparatus includes a latch, and the latch is movable into and away from a blocking position relative to the arm;

the arm is movable to a cocked position, in which the arm is constrained against movement towards the up position by the presence of the latch in the blocking position;

the arrangement of the apparatus is such that, when the apparatus is cocked and the arm is in the cocked position and the latch is in its blocking position, the latch prevents the arm from snapping upwards, and is such that the arm snaps the rod upwards under the action of the main spring when the latch moves from its blocking position;

characterised in that:

the apparatus is so arranged that cocking of the device, by moving the latch to the blocking position of the latch relative to the arm, is effected automatically during, and by, movement of the arm down against the spring, and of subsequent release of the arm;

the apparatus includes a latch holding means, which is effective to hold the latch in the blocking position while the arm is released;

and the apparatus includes a means whereby the arm may be pushed down against the spring by the manual action.

12. Apparatus of claim 11, wherein the apparatus includes a safety-catch, which is movable into and away from a blocking position in which the safety-catch blocks upwards movement of the arm.

13. Apparatus of claim 12, wherein the apparatus includes means for moving the safety-catch into its blocking position, as an automatic operational consequence of downward movement and subsequent release of the arm.

14. Apparatus of claim 13, wherein the apparatus includes a means for manually moving the safety catch away from the blocking position.

15. Apparatus of claim 14, wherein the apparatus includes a means located on, and movable with, the arm, which is suitable for snagging the safety-catch, and for holding the safety-catch away from the blocking position, and which is effective to automatically release the safety-catch back towards the blocking position upon movement upwards of the arm.

16. Apparatus of claim 11, wherein:

the apparatus includes a latch-biasing means which is effective to bias the latch into the blocking position;

the apparatus includes a means, which is in operative engagement with the arm, and which is effective, as the arm is moved downwards, to automatically pick up on the latch, and is effective then to automatically move the latch into the blocking position.

17. Apparatus of claim 16, wherein the latch-biassing means comprises the weight of the latch.

18. Apparatus of claim 16, wherein the apparatus includes an operable trigger, which, when operated, is effective to knock or move the latch away from the blocking position.

19. Apparatus of claim 18, wherein the arm includes a spring-arm and a tube which is suitable for receiving the fishing rod;

the tube is movable upwards and downwards in series with the spring-arm;

the tube has an aperture therein, which is so located and arranged that the tube can move downwards without operating the trigger, in that the trigger is aligned with, and can pass through, the hole in the tube when the tube moves;

the arrangement of the aperture is such that when the fishing rod is present in the tube, and the tube moves downwards, the presence of the rod actuates trigger.

20. Apparatus of claim 19, wherein:

the arm includes a spring-arm and a tube which is suitable for receiving the fishing rod;

the apparatus includes a tube-spring, which acts to support the tube against downwards movement of the tube, the force of the tube-spring being such that the tube can be moved downwards, against the action of the tube-spring, by extra tension in the fishing-line caused by a biting fish.

21. Apparatus of claim 19, wherein the tube is pivoted to the fixed frame at a tube-pivot-point and the spring-arm is pivoted to the fixed frame at a spring-arm-pivot-point, and the two pivot points are at different locations on the frame.

22. Apparatus of claim 11, wherein the arm is arranged on an arm-pivot, and the main-spring is arranged, in relation to the arm-pivot, to so act upon the arm that, as the arm moves down, the mechanical moment of the main-spring on the arm, urging the arm upwards, decreases.

* * * * *